United States Patent [19]

Imafuku et al.

[11] Patent Number: 5,496,380

[45] Date of Patent: Mar. 5, 1996

[54] DISPERSE DYE COMPOSITION AND DYEING METHOD EMPLOYING IT

[75] Inventors: Hideaki Imafuku; Takashi Fujita; Toshikazu Tamiya; Kuniko Kira, all of Kitakyushu, Japan

[73] Assignee: Dystar Japan Ltd., Osaka, Japan

[21] Appl. No.: 443,564

[22] Filed: May 18, 1995

Related U.S. Application Data

[63] Continuation of Ser. No. 210,366, Mar. 18, 1994, abandoned.

[30] Foreign Application Priority Data

Apr. 19, 1993 [JP] Japan .................................. 5-115341

[51] Int. Cl.$^6$ .......................... C09B 29/00; D06P 3/87; D06P 3/54
[52] U.S. Cl. ..................... 8/529; 8/639; 8/643; 8/662; 8/675; 8/696; 8/922
[58] Field of Search ........................... 8/529, 639, 643, 8/662, 675, 696, 922

[56] References Cited

U.S. PATENT DOCUMENTS 4,185,959  1/1988  Imada et al. .......................... 8/638

FOREIGN PATENT DOCUMENTS

| 0164223 | 12/1985 | European Pat. Off. . |
| 1291988 | 3/1962 | France . |
| 229422 | 11/1985 | Germany . |
| 3537257 | 4/1987 | Germany . |

OTHER PUBLICATIONS

Patent Abstracts Of Japan, vol. 16, No. 479 (C–992)(5522), Oct. 6, 1992, JP–A–4 173874, Jun. 22, 1992.

*Primary Examiner*—Margaret Einsmann
*Attorney, Agent, or Firm*—Oblon, Spivak, McClelland, Maier & Neustadt

[57] ABSTRACT

A dispersed dye composition which is (A) a combination of blue dye composition (1) and red dye composition (2); (B) a combination of blue dye composition (1) and yellow dye composition (3); or (C) a combination of blue dye composition (1), red dye composition (2) and yellow dye composition (3); wherein blue dye composition (1) consists of from 35 to 55 weight percent of a compound of Formula (I), from 35 to 55 weight percent of a compound of Formula (II) and from 2 to 20 weight percent of a compound of Formula (III); red dye composition (2) consists of at least one red dye selected from the group of compounds of Formulas (IV-1) and (IV-2); and yellow dye composition (3) consists of at least one dye within the scope of the compound of Formula (V).

7 Claims, No Drawings

DISPERSE DYE COMPOSITION AND DYEING METHOD EMPLOYING IT

This application is a continuation of application Ser. No. 08/210,366, filed on Mar. 18, 1994, now abandoned.

The present invention relates to a disperse dye composition suitable for dyeing a fiber mixture product comprising polyester fibers having different deniers, particularly a combined filament yarn fabric or union cloth product comprising fine denier polyester fibers and regular denier polyester fibers (hereinafter referred to simply as a different denier polyester fiber product).

Dyeing of a different denier polyester fiber product comprising fine denier polyester fibers of e.g. from 0.1 d to 0.7 d and regular denier polyester fibers of e.g. from 1 d to 5 d is carried out usually by a conventional dyeing method with a known disperse dye. However, such dyeing has a problem that the dyed product has a color difference between fibers in use (i.e. poor in solid dyeing) or undergoes a substantial decrease in fastness.

Due to the difference in the specific surface areas of the constituting fibers, the different denier polyester fiber product has a difference in the dyeing behavior of the dye, whereby a color difference between fibers in use or a decrease in fastness will result. A study is being made for a method of solving this problem simply without providing a special process step.

The present inventors have conducted extensive studies on the above problem and as a result, have found it possible to solve the above problem by using a disperse dye composition comprising:

(1) a blue dye mixture comprising from 35 to 55 wt % of a compound of the following formula (I), from 35 to 55 wt % of a compound of the following formula (II), and from 2 to 20 wt % of a compound of the formula (III) (the sum of (I), (II) and (III) is 100 wt %):

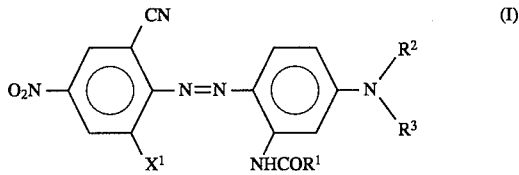
(I)

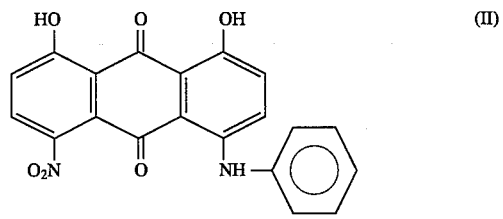
(II)

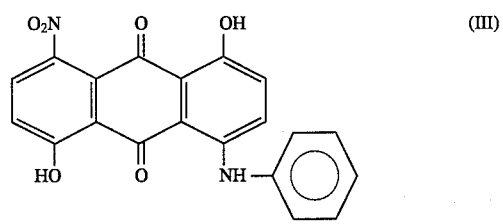
(III)

wherein $X^1$ is —CN or —NO$_2$, $R^1$ is a methyl group or an ethyl group, and each of $R^2$ and $R^3$ which are independent of each other, is a $C_2$–$C_4$ alkyl group, and (2) at least one red dye selected from the group consisting of compounds of the following formulas (IV-1) and (IV-2):

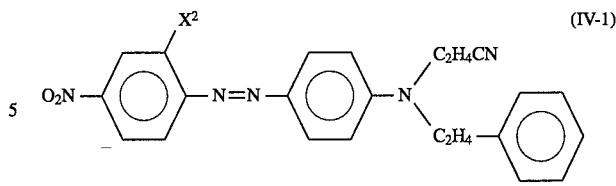
(IV-1)

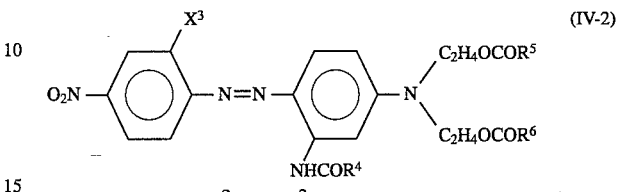
(IV-2)

wherein each of $X^2$ and $X^3$ which are independent of each other, is —CN or a halogen atom, and each of $R^4$, $R^5$ and $R^6$ which are independent of each other, is a methyl group or an ethyl group, and/or (3) at least one yellow dye selected from the group consisting of compounds of the following formula (V):

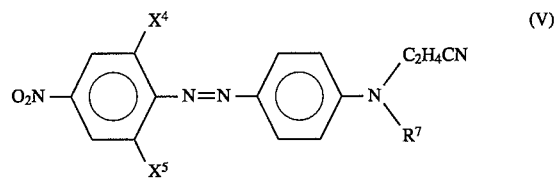
(V)

wherein each of $X^4$ and $X^5$ which are independent of each other, is a halogen atom, and $R^7$ is —$C_2H_4CN$ or —$C_2H_4OCOC_6H_5$.

Now, the present invention will be described in detail with reference to the preferred embodiments.

In the blue dye mixture, the ratio of the dye of the formula (I), the dye of the formula (II) and the dye of the formula (III) is from 35 to 55 wt %:from 35 to 55 wt %:from 2 to 20 wt %, preferably from 40 to 50 wt %:from 40 to 50 wt %:from 5 to 15 wt %. The $C_2$–$C_4$ alkyl group for each of $R^2$ and $R^3$ in the formula (I) is preferably an ethyl group or a propyl group. If the ratio of (I), (II) and (III) is outside the above range, a color difference between fibers in use is likely to result, such being undesirable.

$X^2$ in the formula (IV-1) for the red dye is preferably —CN. The halogen atom for $X^3$ in the formula (IV-2) may, for example, be a chlorine atom or a bromine atom, preferably a chlorine atom. Each of $R^4$, $R^5$ and $R^6$ is preferably a methyl group.

The red dyes of the formulas (IV-1) and (IV-2) may be used in combination as a mixture.

The halogen atom for each of $X^4$ and $X^5$ in the formula (V) for the yellow dye, may, for example, be a chlorine atom or a bromine atom, preferably a chlorine atom.

The blend ratio of the blue dye to the red dye and/or the yellow dye is such that per 100 parts by weight of the blue dye, the red dye is from 0.1 to 100,000 parts by weight, preferably from 1 to 10,000 parts by weight, and the yellow dye is from 0.1 to 100,000 parts by weight, preferably from 1 to 10,000 parts by weight. The blend ratio is suitably selected within such ranges to obtain a desired color.

In the present invention, the blue dye is incorporated so that it is compatible with the red dye and the yellow dye, whereby no color difference between fibers in use will result even when the ratio of the red dye or the yellow dye to the blue dye is varied.

Now, the present invention will be described in further detail with reference to Examples.

EXAMPLE 1

A union cloth product comprising 50 parts by weight of fine denier polyester fibers (0.1 d) and 50 parts by weight of regular denier polyester fibers (2 d), was dyed by a conventional method under the dyeing conditions and with the recipe as identified in Table 1.

TABLE 1

Yellow component

$O_2N$—[benzene with Cl, Cl]—$N=N$—[benzene]—$N(C_2H_4CN)(C_2H_4OCO$—[phenyl]$)$    1.1% o.w.f.

Red component

$O_2N$—[benzene with CN]—$N=N$—[benzene]—$N(C_2H_4CN)(C_2H_4$—[phenyl]$)$    0.615% o.w.f.

Blue components

(1) $O_2N$—[benzene with CN, CN]—$N=N$—[benzene with NHCOCH$_3$]—$N(C_2H_5)(C_2H_5)$ (2) 1,8-dihydroxy-4-nitro-5-(phenylamino)anthraquinone [HO, OH / O$_2$N, NH-phenyl]

(3) 1,5-dihydroxy-4-nitro-8-(phenylamino)anthraquinone [O$_2$N, OH / OH, NH-phenyl]

(1):(2):(3) = 45 wt %: 47 wt %: 8 wt %    0.882% o.w.f.

| | |
|---|---|
| Dispersing and leveling agent: Eganal LMD-J (Product of Hoechst Japan Limited) | 1 g/l |
| pH adjusting agent/buffer: acetic acid/sodium acetate | adjusted to pH 5 |
| Bath ratio | 1:10 |
| Temp × Time | 120° C. × 60 min. |

Then, the dyed cloth was subjected to reduction cleaning treatment at 80° C. for 10 minutes at a bath ratio of 1:30 using an aqueous solution containing 1 g/l of Hostapal LFB conc (cleaning agent, manufactured by Hoechst Japan Limited), 2 g/l of sodium hydroxide (flakes) and 2 g/l of hydrosulfite, and then subjected to heat setting at 180° C. for 1 minute. The dyed cloth thus treated, was evaluated with respect to the following items by conventional methods.

Color difference between fibers in use:

Using 2 d fibers as the standard, the relative value of CIE $L^*a^*b^*$ of 0.1 d fibers were measured, and the degree of solid dyeing was evaluated and the results are shown in Table 5.

Fastness:

The color fastness to light was measured in accordance with JIS L0842-1988 (carbon-arc lamp test, evaluated by blue scale), and the color fastness to washing was measured in accordance with AATCC test method 61-1989 (test number 2A, WOB standard cleaning agent, multifiber test cloth No. 10A, evaluated by gray scale for assessing staining), and the results are shown in Table 5.

EXAMPLE 2

The dyeing and evaluation were conducted in the same manner as in Example 1 except that the recipe was changed as identified in Table 2. The results are shown in Table 5.

TABLE 2

Yellow component

$O_2N$—[benzene with Cl, Cl]—$N=N$—[benzene]—$N(C_2H_4CN)(C_2H_4OCO$—[phenyl]$)$    2.60% o.w.f.

Red component

$O_2N$—[benzene with CN]—$N=N$—[benzene]—$N(C_2H_4CN)(C_2H_4$—[phenyl]$)$    0.24% o.w.f.

Blue components

(1) $O_2N$—[benzene with CN, CN]—$N=N$—[benzene with NHCOCH$_3$]—$N(C_2H_5)(C_2H_5)$ (2) [anthraquinone structure as in Table 1]

(3) [anthraquinone structure as in Table 1]

(1):(2):(3) = 45 wt %: 47 wt %: 8 wt %    0.65% o.w.f.

EXAMPLE 3

The dyeing and evaluation were conducted in the same manner as in Example 1 except that the recipe was changed as shown in Table 3. The results are shown in Table 5.

TABLE 3

Yellow component

$O_2N$—[benzene with Cl, Cl]—$N=N$—[benzene]—$N(C_2H_4CN)(C_2H_4OCO$—[phenyl]$)$    3.4% o.w.f.

TABLE 3-continued

Red component

O₂N—C₆H₃(CN)—N=N—C₆H₄—N(C₂H₄CN)(C₂H₄—C₆H₅)   1.4% o.w.f.

Blue components (1) O₂N—C₆H₂(CN)₂—N=N—C₆H₃(NHCOCH₃)—N(C₂H₅)(C₂H₅)   (1):(2):(3)   1.0% o.w.f.
45 wt %:
47 wt %:
8 wt %

(2) 1,8-dihydroxy-4-nitro-5-(phenylamino)anthraquinone derivative (HO, O, OH, O₂N, O, NH—C₆H₅)

TABLE 3-continued (3) 1,8-dihydroxy-5-nitro-4-(phenylamino)anthraquinone derivative (O₂N, O, OH, OH, O, NH—C₆H₅)

COMPARATIVE EXAMPLE 1

The dyeing and evaluation were conducted in the same manner as in Example 1 except that the recipe as identified in Table 4 was used as a conventional recipe for combination dyeing with trichromatic colors. The results are shown in Table 5.

TABLE 4

Yellow component

O₂N—C₆H₂Cl₂—N=N—C₆H₄—N(C₂H₄CN)(C₂H₄OCOCH₃)   1.0% o.w.f.

Red component

O₂N—C₆H₃Cl—N=N—C₆H₃(NHCOCH₃)—N(C₂H₄OCOCH₃)₂   0.675% o.w.f.

Blue component

O₂N—C₆H₂(CN)₂—N=N—C₆H₃(NHCOCH₃)—N(C₂H₅)₂   0.25% o.w.f.

TABLE 5

| | Evaluated items | | | | | |
|---|---|---|---|---|---|---|
| | Color difference between fibers in use CIE L*a*b* (2d fiber Std.) | | | Color fastness on 0.1d fiber | | |
| | | | | Color fastness to light | Color fastness to washing (AATCC 2A) | |
| | $\Delta L^*$ | $\Delta a^*$ | $\Delta b^*$ | (carbon-arc lamp) | Acetate stain | Nylon stain |
| Example 1 | 0.92 | 0.44 | 1.05 | 5⁺ grade | 4 grade | 4 grade |
| Example 2 | −0.86 | −0.89 | −1.10 | 5 grade | 4–5 grade | 5⁻ grade |
| Example 3 | 0.13 | −0.42 | 0.17 | 5 grade | 3–4 grade | 4 grade |
| Comparative Example 1 | −1.21 | 1.76 | −2.48 | 4–5 grade | 3 grade | 3–4 grade |

As is shown in Table 5, the differences between $\Delta L^*$, $\Delta a^*$ and $\Delta b^*$ of Examples 1 to 3 are less than that of Comparative Example 1, which means the disperse dye composition of the present invention is capable of dyeing a different denier polyester fiber product excellently with no substantial color difference between fibers in use. Further, the disperse dye composition of the present invention provides dyed fabrics having good color fastness.

We claim:

1. A disperse dye composition, which is:
   (A) a combination of blue dye composition (1) and red dye composition (2);
   (B) a combination of blue dye composition (1) and yellow dye composition (3); or
   (C) a combination of blue dye composition (1), red dye composition (2) and yellow dye composition (3); wherein:

blue dye composition (1) consists of from 35 to 55 wt. % of a compound of formula (I), from 35 to 55 wt. % of a compound of formula (II), and from 2 to 20 wt. % of a compound of formula (III) (the sum of the three compounds having formulas I, II and III being 100 wt. %)

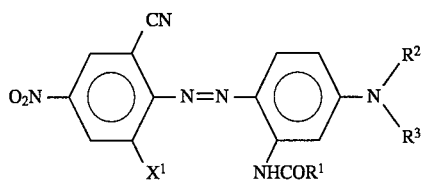 (I)

wherein $X^1$ is —CN or —NO$_2$, $R^1$ is a methyl group or an ethyl group, and each of $R^2$ and $R^3$ which are independent of each other, is a C$_2$–C$_4$ alkyl group,

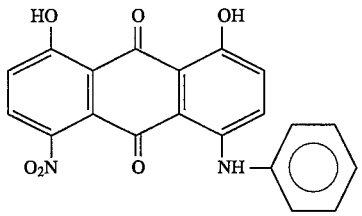 (II)

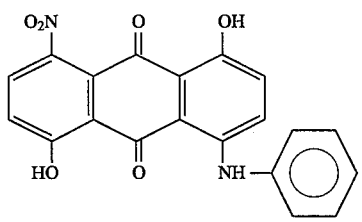 (III)

red dye composition (2) consists of at least one red dye selected from the group consisting of compounds of formulas (IV-1) and (IV-2):

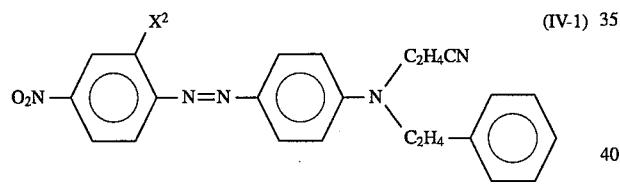 (IV-1)

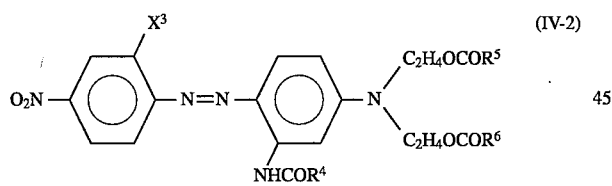 (IV-2)

wherein each of $X^2$ and $X^3$ which are independent of each other, is —CN or a halogen atom, and each of $R^4$, $R^5$ and $R^6$ which are independent of each other, is a methyl group or an ethyl group; and yellow dye composition (3) consists of at least one yellow dye selected from the group consisting of compounds of formula (V):

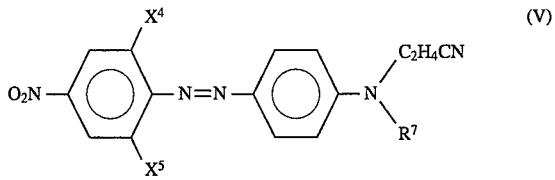 (V)

wherein each of $X^4$ and $X^5$ which are independent of each other, is a halogen atom, and $R^7$ is —C$_2$H$_4$CN or —C$_2$H$_4$OCOC$_6$H$_5$.

2. The disperse dye composition according to claim 1, wherein the weight ratio of the blue dye:the red dye is 100:0.1 to 100,000.

3. The disperse dye composition according to claim 1, wherein the weight ratio of the blue dye:the yellow dye is 100:0.1 to 100,000.

4. The disperse dye composition according to claim 1, wherein the weight ratio of the blue dye:the red dye:the yellow dye is 100:0.1 to 100,000:0.1 to 100,000.

5. The disperse dye composition according to claim 1 or 4, wherein in the formula (I), $X^1$ is —CN, $R^1$ is a methyl group, and each of $R^2$ and $R^3$ is an ethyl group, in the formula (IV-1), $X^2$ is —CN and in the formula (V), each of $X^4$ and $X^5$ is a chlorine atom and $R^7$ is —C$_2$H$_4$OCOC$_6$H$_5$.

6. A method for dyeing a combined filament yarn fabric or union cloth product comprising fine denier polyester fibers of from 0.1 d to 0.7 d and regular denier polyester fibers of from 1 d to 5 d, comprising:

contacting said combined filament yarn fabric or union cloth product with a disperse dye composition as defined in claim 1.

7. A dyed product prepared by a process comprising:

contacting a combined filament yarn fabric or union cloth product comprising fine denier polyester fibers of from 0.1 d to 0.7 d and regular denier polyester fibers of from 1 d to 5 d with a disperse dye composition as defined in claim 1.

* * * * *